United States Patent
Shimizu et al.

(10) Patent No.: US 6,267,826 B1
(45) Date of Patent: Jul. 31, 2001

(54) PROCESS FOR PRODUCING RESIN-COATED ALUMINUM ALLOY SHEET FOR DRAWN/IRONED CANS

(75) Inventors: Keiichi Shimizu; Shinji Shirai; Yasayuki Ikeda, all of Yamaguchi-ken; Ayumu Taniguchi, Tokyo; Jun-Ichi Tanabe, Yamaguchi-ken; Fumio Kunishige, Yamaguchi-ken; Masao Komai, Yamaguchi-ken, all of (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/171,118

(22) PCT Filed: Apr. 10, 1997

(86) PCT No.: PCT/JP97/01244
§ 371 Date: Apr. 1, 1999
§ 102(e) Date: Apr. 1, 1999

(87) PCT Pub. No.: WO97/38148
PCT Pub. Date: Oct. 16, 1997

(30) Foreign Application Priority Data

Apr. 10, 1996 (JP) .................................................. 8-112129

(51) Int. Cl.⁷ .................................................. C23C 22/00
(52) U.S. Cl. ........................... 148/251; 148/265; 148/275; 148/696; 148/703
(58) Field of Search ................................... 148/251, 257, 148/265, 275, 696, 697, 703

(56) References Cited

U.S. PATENT DOCUMENTS

| | | | |
|---|---|---|---|
| 5,093,208 | * 3/1992 | Heyes et al. | 428/623 |
| 5,098,490 | * 3/1992 | Huu | 148/693 |
| 5,149,389 | 9/1992 | Heyes et al. | |
| 5,362,341 | * 11/1994 | Palmer et al. | 148/692 |
| 6,017,599 | * 1/2000 | Sakamoto et al. | 428/35.8 |

FOREIGN PATENT DOCUMENTS

| | | |
|---|---|---|
| 0 312 304 | 4/1989 | (EP) . |
| 0312304 | 4/1989 | (EP) . |
| 2 286 364 | * 8/1995 | (GB) . |
| 2-501638 | 6/1990 | (JP) . |
| 4-091825 | 3/1992 | (JP) . |
| 6-312223 | 11/1994 | (JP) . |
| 6312223 | 11/1994 | (JP) . |
| 7-233456 | 9/1995 | (JP) . |
| 7-266496 | 10/1995 | (JP) . |
| 7266496 | 10/1995 | (JP) . |

OTHER PUBLICATIONS

Japanese Abstract JP–4–91825, Mar. 1990.
Japanese Abstract JP–7–233456, Sep. 1995.

* cited by examiner

Primary Examiner—John Sheehan
Assistant Examiner—Andrew L. Oltmans
(74) Attorney, Agent, or Firm—Browdy and Neimark

(57) ABSTRACT

A method of manufacturing a resin-coated aluminum alloy sheet for drawn and ironed cans, which can be formed into a drawn and ironed can free from its wall breaking and having enough strength as a can, when it is formed through a composite forming process, the process including a bending and bending back operation at a die shoulder rounded portion of a small shoulder radius and a subsequent ironing operation, under dry condition; which comprises the steps of homogenization heat treating an aluminum alloy ingot containing essentially 0.5 to 2.0 wt % of Mn, 0.2 to 2.0 wt % of Mg, 0.05 to 0.4 wt % of Si and not more than 0.7 wt % of Fe as inevitable impurities, wherein $(Si+Fe) \leq 0.9$ wt %, and subjecting the aluminum alloy ingot to hot rolling to obtain an aluminum alloy sheet to continuous annealing or box annealing, cold rolling, and a surface treatment, heating the resultant sheet, and then coating both surfaces of the sheet with a thermoplastic resin at a predetermined temperature, and immediately quenching the sheet.

8 Claims, No Drawings

PROCESS FOR PRODUCING RESIN-COATED ALUMINUM ALLOY SHEET FOR DRAWN/IRONED CANS

SPECIFICATION

1. Field of the Invention

The present invention relates to a method of manufacturing a material used for a two piece can which is manufactured by forming method including a drawn and ironing process. More specifically, it relates to a method of manufacturing a resin coated aluminum alloy sheet for a drawn and ironed can, wherein the resin coated aluminum alloy sheet is produced by coating a thermoplastic resin onto an aluminum alloy sheet and suitable for forming into a two-piece can the wall of which is thinned by a forming method including a drawing and ironing process, and wherein the two-piece can is manufactured without cooling by water or lubricating by water-type lubricant, or cleaning the finished can.

2. Prior Art

As a two-piece can which is integrally formed with a can body portion and a bottom portion, a DI can (Drawn and Ironed Can) has so far been produced by drawing and ironing a tin plate or an aluminum alloy plate into a can. After the tin plate or the aluminum alloy plate is drawn into such DI can, it is cooled by a large quantity of water or lubricated by a water-type lubricant using several ironing dies continuously disposed, and punches until it is so thinned as to have a wall thickness of one third of the original wall thickness. Thereafter, the DI can is degreased and washed, dried and coated. Lately, Japanese Laid-open Publication No. Hei-6-312223 has disclosed a method for producing a two-piece can from a resin-coated metal sheet using a composite forming method including drawing and ironing process. This method differs from the conventional DI can producing method in that a resin-coated metal sheet to which a high temperature volatile lubricant is applied is drawn, and then, redrawn and ironed at the same time (i.e., the composite forming method) under dry conditions without the use of water or water-type lubricant until the thickness of the two-piece can is sufficiently decreased. This composite forming method dispenses with the processes of degreasing, washing, drying, and coating the formed two-piece can, which makes it possible to produce two-piece cans without contaminating the environment. The present invention has been investigated to provide a resin-coated aluminum alloy sheet suitable for this composite forming method. As for the material suitable for the composite forming method, Japanese Laid-open Publication No. Hei-7-266496 discloses a material which is restricted with regard to yield strength, tensile strength, thickness, arithmetical mean deviation of profile, or the like, and also discloses the use of an aluminum alloy of JIS 3004 H19 as an example. The present invention has an object to provide a resin-coated aluminum alloy sheet suitable for the composite forming method as disclosed in Japanese Laid-open Publication No. Hei-6-312223. The composite forming method as a target of the present invention comprises simultaneous processes of a redrawing process and an ironing process using a die in which a portion for redrawing and a portion for ironing are coupled in pairs. One of the characteristics of the composite forming method is that the shoulder radius of the die portion for redrawing is made smaller and this shoulder rounded portion works to bend and bend back a can piece so as to make thinner the wall thickness of the can piece. In this composite forming method, since the work piece is intensely bent and bent back with a very small shoulder radius that is only two or a few times the thickness of the work piece, the work piece often suffers surface coarseness or cracks, and under some circumstances it even suffers surface breaking due to the shoulder rounded portion. Even in case where the can piece is safely formed without being broken at the shoulder rounded portion, the surface coarseness and cracks result in deterioration of the adhesion of the aluminum alloy sheet to the resin coating, which causes the can wall to easily suffer breaking in the next ironing process. Therefore, the object of the present invention is to provide a resin-coated aluminum alloy sheet for a drawn and ironed can which is free from its wall breaking and has enough strength as a can, when it is formed through a composite forming process, the process including a bending and bending back operation at a die shoulder rounded portion of a small radius and a subsequent ironing operation, under dry conditions. The aluminum alloy of JIS 3004 H19 disclosed in Japanese Laid-open Publication No. Hei-7-266496 has enough strength, but it lacks substantial formability to achieve the aim of the present invention.

DISCLOSURE OF THE INVENTION

The present invention comprises a method of manufacturing a resin-coated aluminum alloy sheet for a drawn and ironed can. The method comprises the steps of homogenization heat treating an aluminum alloy ingot containing essentially 0.5 to 2.0 wt % of Mn, 0.2 to 2.0 wt % of Mg, 0.05 to 0.4 wt % of Si and not more than 0.7 wt % of Fe as inevitable impurities, wherein (Si+Fe)≦0.9 wt %, subjecting the resultant product to hot rolling by a normal manner to obtain a hot-rolled aluminum alloy sheet, subsequently subjecting the hot-rolled sheet to continuous annealing, cold rolling at a reduction ratio of 60 to 95%, and a surface treatment, heating the thus surface treated aluminum alloy sheet at a temperature of 240 to 350° C. for a time within one minute, retaining the aluminum alloy sheet at a temperature of 220 to 300° C., and then coating both surfaces of the sheet with a thermoplastic resin, and immediately quenching the resultant product.

The present invention further comprises a method of manufacturing a resin-coated aluminum alloy sheet for a drawn and ironed can, which comprises the steps of homogenization heat treating an aluminum alloy ingot containing essentially 0.5 to 2.0 wt % of Mn, 0.2 to 2.0 wt % of Mg, 0.05 to 0.4 wt % of Si and not more than 0.7 wt % of Fe as inevitable impurities, wherein (Si+Fe)≦0.9 wt %, subjecting the resultant product to hot rolling by a normal manner to obtain a hot-rolled aluminum alloy sheet, subsequently subjecting the hot-rolled a sheet to box annealing, cold rolling at a reduction ratio of 60 to 95%, and surface treatment, heating the thus surface treated aluminum alloy sheet at a temperature of 240 to 350° C. for a time within one minute, retaining the aluminum alloy sheet at a temperature of 220 to 300° C., and then coating both surfaces of the sheet with a thermoplastic resin, and immediately quenching the resultant product.

Furthermore, the present invention is characterized in that the thermoplastic resin coated onto the aluminum alloy sheet is a thermoplastic polyester resin and the surface treatment applied onto the aluminum alloy sheet is etching and/or electrolytic chromic acid treatment and/or phosphoric acid chromating.

THE BEST MODE FOR CARRYING OUT THE INVENTION

A diversity of investigation has been made to obtain a resin-coated aluminum alloy sheet excellent in strength, formability, and adhesion, and also excellent in formable endurance in the drawing and ironing operations under dry conditions. Consequently, a method of manufacturing such a desired resin-coated aluminum alloy sheet has been developed by determining the composition of an aluminum alloy, kind of thermoplastic resin coating, type of surface treatment therefor, and so on. The present invention is explained in detail below referring to examples.

First, the reason for restricting the alloy composition of an aluminum alloy sheet used as a substrate of the resin-coated aluminum alloy sheet of the present invention is described. Each content of the alloy elements is hereinafter expressed by weight %.

[Mn]

Manganese is added to economically obtain strength of the aluminum alloy sheet. A less than 0.5% Mn content does not have an effect. On the other hand, a Mn content exceeding 2.0% causes an Al—Fe—Mn system crystallized matter to be increased in the aluminum alloy sheet, resulting in deterioration of the formability of the aluminum alloy sheet being bent and bent back, and thus hindering the very object of the present invention. In the DI forming process widely employed in the commercial production, the Al—Fe—Mn system crystallized matter serves as a lubricant in the ironing operation, and is therefore essential to an improvement in ironing-formability of the aluminum alloy sheet.

However, according to the present invention, since an aluminum alloy sheet, with its surface coated with a resin, is to be formed, there is no need for the lubricating effect by the Al—Fe—Mn system crystallized matter. Rather conversely, the Al—Fe—Mn system crystallized matter acts to lower the formability of the aluminum alloy sheet. Namely, the presence of the above mentioned crystallized matter is not desirable to the composite forming process, which is employed for manufacturing a resin-coated aluminum alloy sheet of the present invention. The composite forming process is characterized in that redrawing and ironing operations are simultaneously performed by the use of a die having coupled portions for redrawing and ironing, wherein a shoulder radius of the redrawing portion is made several times smaller than the thickness of a can piece. The crystallized matter extremely impairs the formability of the can piece when the can piece is bent and bent back at the die shoulder rounded portion. In other words, the aluminum alloy sheet easily suffers surface coarseness and cracks during bending and bending back operation, which further results in deterioration of the adhesion of the aluminum alloy sheet to the resin coating. Moreover, if the amount or the grain size of the crystallized matter is improper or under unsuitable forming conditions, breaking occurs in the can wall. Thus, unlike the case of the DI forming method, the presence of Al—Fe—Mn system crystallized matter is undesirable for the present invention and it should be preferably reduced to minimum.

[Mg]

Magnesium has a better effect on the improvement in strength of an aluminum alloy sheet than Mn. A 0.2% or more Mg amount is added to obtain enough strength as a can, chiefly to obtain pressure resistance of the can bottom portion. Mg is an expensive element and besides an increasing amount of Mg results in deterioration of moldability of the aluminum alloy sheet. Therefore, the upper limit of Mg content is determined to be 2.0% from an economical point of view and in view of the moldability. The two-piece can prepared from the resin-coated aluminum alloy sheet of the present invention by the afore-mentioned composite forming process is usually used as a container for content such as beer, carbonic acid beverage, or nitrogen filling beverage with its inner pressure being positive. If such two-piece can does not have enough strength at the bottom piece, the can is dented and deformed at its bottom portion, which makes the can of no commercial value. The strength of the bottom portion of a can is mainly attributed to yield strength and thickness of its material sheet. Therefore, when the yield strength of the material sheet is not enough, the thickness thereof should be increased in compensation for it, resulting in economical loss.

[Si]

Silicon causes an Al—Fe—Mn system crystallized matter to be phase transformed to form a so-called hard a phase. In the producing process of a a DI can, the a phase acts to improve ironing formability of the DI can, so it is necessary to add 0.1% or more Si to the material. However, in the present invention, the a phase acts unfavorably to lower the bending and benting back formability of the resin-coated aluminum alloy sheet even more than the crystallized matter not yet phase transformed does. Therefore, the lower limit of Si content is determined to be 0.05% with a view to improving strength of the sheet. The upper limit thereof is 0.4% and more preferably 0.2% or less in view of the formability.

[Fe]

Iron forms an Al—Fe—Mn crystallized matter in combination with Mn. As described before, the presence of Al—Fe—Mn system crystallized matter is undesirable to the present invention in view of the bending and bending back formability, so the upper limit of Fe content as a constituent of the above mentioned crystallized matter is determined to be 0.7% and more preferably 0.4% or less.

[Si+Fe]

It is necessary to define the upper limit of a sum amount of (Si+Fe) in order to control the amount of Al—Fe—Mn system crystallized matter, particularly the amount of hard a phase to a low level. Although the upper limits of Fe content and Si content are determined as mentioned above, respectively, if both contents are nearly their upper limits, the resultant Al—Fe—Mn system crystallized matter may impair formability of the aluminum alloy sheet. Therefore, the upper limit of (Si+Fe) is determined to be 0.9% and more preferably 0.5% or less.

[Cu]

Copper reacts with Magnesium to form Al—Cu—Mg system precipitate, exhibiting precipitation hardening, and has an effect on improvement in strength of an aluminum alloy sheet, so a 0.05% or more amount of Cu should be added. However, an increasing content of Cu results in deterioration of formability of the aluminum alloy sheet, so the Cu content may preferably be 0.4% or less.

Besides, addition of Zn to an aluminum alloy is effective to properly disperse the crystallized matter, and therefore it is desirable for the aluminum alloy to include 0.01 to 0.5% Zn with a view to alleviating the impairment due to the crystallized matter.

Next, the manufacturing method of the present invention is explained. An aluminum alloy comprising the chemical compositions mentioned above is melted and casted in a normal manner. The obtained aluminum alloy ingot is subjected to a homogenization heat treatment prior to hot rolling. The homogenization heat treatment is carried out for the purpose of homogenizing micro-demixing of elements and precipitating over-saturated elements so as to make the material be homogenized and resultantly to improve hot rolling performance thereof. When the temperature for the homogenization heat treatment is lower than 500° C., the homogenizing effect is insufficient. On the other hand, when the temperature is higher than 600° C., the surface performance of the material sheet will be decreased. The treatment duration within the temperature range mentioned above is preferably one hour or longer.

Subsequently to the homogenization heat treatment, the aluminum alloy ingot is hot rolled in a normal manner. The temperature during hot rolling is not specifically limited but preferably 400 to 520° C. for the initial rolling time and 230 to 350° C. for the finish-rolling time.

After hot rolling, the rolled aluminum alloy sheet is subjected to continuous annealing or box annealing. In a case where the aluminum alloy sheet is continuous-annealed, the heating rate and the cooling rate may preferably be 100° C./min. or more. When the rates are less than 100° C./min., crystal grains in the aluminum alloy sheet become large and coarse, resulting in insufficient strength and formability of the sheet. The heating temperature may be 400 to 580° C. When the heating temperature is below 400° C., recrystallization does not completely occur, providing no improvement in the formability of the aluminum alloy sheet. On the other hand, when the heating temperature is higher than 580° C., the surface of the aluminum alloy sheet is burned and the appearance thereof is impaired. Further, a heating time over 5 minutes promotes softening of the aluminum alloy sheet and therefore the aluminum alloy sheet cannot attain a required strength.

In the other case where the aluminum alloy sheet is box annealed, it is heated at a temperature of 300 to 400° C., and soaked and retained for a duration of 30 minutes to 5 hours and then gradually cooled. When the heating temperature is below 300° C., recrystallization does not completely occur in the aluminum alloy sheet. On the other hand, when the heating temperature is higher than 400° C., crystal grains in the aluminum alloy sheet become extraordinarily large and coarse, unfavorably. When the soaking duration is shorter than 30 minutes, heating the inside of a coil is insufficient, but over 5 hours soaking is not only uneconomical but unfavorable because the aluminum alloy sheet is extremely softened.

After subjected to either one of the above mentioned annealing treatments, the aluminum alloy sheet is cold rolled. The rolling reduction ratio may preferably be 60% to 95%. After cold rolled under this condition, the aluminum alloy sheet is subjected to a heat treatment at a temperature of 240 to 350° C. for a time within one minute. As the rolling reduction ratio increases, the crystallized matter in the aluminum alloy sheet is oriented in the rolling direction, voids are formed around the crystallized matter, and forming distortion is accumulated, resulting in deterioration of the bending and bending back formability of the aluminum alloy sheet. Therefore, the reduction ratio is limited up to 95% in view of the formability. On the other hand, the lower limit of the reduction ratio is 60% with a view to obtaining a necessary strength. The aluminum alloy sheet thus rolled is then surface treated and thereafter heated at a temperature of 240 to 350° C. within one minute before being coated with a resin so as to relieve the decreased formability due to the above mentioned rolling operation. The lower limit of the heating temperature is 240° C. with a view to the stress relief and the upper limit thereof is 350° C. with a view to hindering recrystallization. Longer heating promotes softening of the aluminum alloy sheet, with the result that the sheet cannot attain a required strength. Therefore, the heating time in the above mentioned temperature range is limited within one minute. Further, this heat treatment should be carried out directly before the step of resin coating. Namely, once the aluminum alloy sheet is heated to the above mentioned temperature, then it is cooled down to a specified temperature, at which it should be coated with a resin. Thus, the aluminum alloy sheet coated with a resin can be economically manufactured.

After cold rolled as mentioned above, the aluminum alloy sheet is subjected to known surface treatments such as anodizing, dip chromic acid treatment, phosphoric acid chromating, etching by the use of an alkali solution or an acid solution, and electrolytic chromic acid treatment. The present invention may preferably employ etching and/or electrolytic chromic acid treatment or phosphoric acid chromating. In particular, in a case where the aluminum alloy sheet is provided on its surface with a dual-layer film composed of metal chrome and chromic hydrateoxide by the electrolytic chromic acid treatment, the coating mass of chromic hydrateoxide may preferably be 3 to 50 mg/m$^2$ and more preferably 7 to 40 mg/m$^2$ by the weight of chromium in view of formable adhesion to a resin film laminated to the aluminum alloy sheet. The metal chrome is not specifically limited but may preferably be 1 to 100 mg/m$^2$ and more preferably 5 to 30 mg/m$^2$ in view of corrosion resistance after forming and the formable adhesion to the resin film. Further, in the case where the aluminum alloy sheet is subjected to the phosphoric acid chromating, the coating mass of chromate may preferably be 3 to 30 mg/m$^2$ and more preferably 5 to 20 mg/m$^2$ by the weight of chromium.

As a thermoplastic resin to be laminated onto at least one side of the aluminum alloy sheet according to the present invention, a single layer or multi-layer resin film mainly including a resin selected from the group consisting of polyester resin, polyolefin resin, polyamid resin, polycarbonate resin, and so on, or blended resin film including two or more than two resins selected from the above mentioned group, or a copolymerization resin film can be used. Especially, as a thermoplastic resin film for use in a DI can according to the present invention which is to be severely formed, a copolymerization polyester resin film including polyethylene terephthalate and constitutional repeating unit (CRU) of ethylene terephthalate as a main constituent, or a polyester resin film including polybutylene terephthalate and CRU of butylene terephthalate as a main constituent, or a blended polyester resin film including at least two polyester resins selected from those polyester resins, or a multi-layer polyester resin film having at least two layers of polyester resins selected from the above mentioned polyester resins laminated to each other can be used. Further, a polycarbonate resin film, or a blended resin film including polycarbonate resin and at least one polyester resin selected from the above mentioned polyester resins, or a multi-layer resin film having a layer of polycarbonate and at least two layers of polyester resins selected from the above mentioned polyester resins laminated each other can be used. Such a thermoplastic resin film may preferably be prepared by forming a thermoplastic resin into a film using a known extruder, then bi-axially orienting the resin film, and heat setting it to produce a bi-axially oriented resin film.

The resin film to be laminated to the metal substrate may preferably have a thickness of 5 to 50 $\mu$m and more preferably 10 to 30 $\mu$m. When the resin film has a thickness of not more than 5 $\mu$m, it is difficult to continuously laminate such resin film to the metal substrate at high speed. On the other hand, when the thickness of the resin film to be laminated to the metal substrate is 50 $\mu$m or more, this is economically unfavorable compared with epoxy-base resin coating which is widely used for the manufacture of cans.

The resin film can be laminated directly onto the aluminum alloy substrate. Or, a thermosetting adhesive layer of epoxy-phenol resin or the like can be provided between the resin film and the aluminum alloy substrate so as to laminate them together. Namely, either a surface of the resin film or a surface of the aluminum alloy substrate, i.e., the surface that is to be bonded to the other, is in advance coated with the thermosetting adhesive so that the resin film can be laminated to the aluminum alloy substrate with the thermosetting adhesive layer interposed between them.

The temperature of the aluminum alloy substrate at the time of lamination is 220 to 300° C., though it depends on the kind of a resin to be laminated onto the substrate. When the lamination temperature of the aluminum alloy sheet is not higher than 220° C., the resultant resin-coated aluminum alloy sheet exhibits poor formable adhesion and the resin film that has been laminated onto the substrate is easily peeled off after the resin-coated aluminum alloy sheet is subjected to drawing. On the other hand, when the lamination temperature is 300° C. or higher, the resin film laminated to the substrate is melted and adheres to lamination rolls or others, thus hindering the laminating operation. For these reason, the upper and the lower limits of the temperature of the aluminum alloy substrate at the time of the lamination with the resin film are determined.

Next, the afore-mentioned thermoplastic resin film is made to contact with both surfaces of the aluminum alloy substrate that has been heated to the above mentioned temperature, and they are superposed upon each other and nipped by a pair of lamination rolls to be press-joined together, then immediately and rapidly cooled down to a temperature of or below the recrystallization point of the thermoplastic resin film. Thus, through the process as mentioned above, a resin-coated aluminum alloy sheet for a drawn and ironed can is produced.

The thermoplastic resin coated aluminum alloy sheet produced by the manufacturing method of the present invention as described above is finally coated with a high temperature volatile lubricant on its surface and the thus prepared sheet is drawn and ironed, and then formed into a two-piece can having a small wall thickness without cooling by water or lubricating by water-type lubricant, or cleaning the finished can. The high temperature volatile lubricant may preferably be volatilized by 50% or more, when the formed can piece coated with this lubricant is heated at a high temperature of about 200° C. for a few minutes after it is subjected to DI forming. More specifically, a simple body of fluid paraffin, synthetic paraffin, natural wax, or the like, or a mixture of such simple bodies may be selected in accordance with the forming condition and the heating condition after forming. Such high temperature volatile lubricant usable in the present invention may desirably have a melting point of 25 to 80° C. and a boiling point of 180 to 400° C. The amount of the high temperature volatile lubricant to be applied to the thermoplastic resin coated aluminum alloy sheet should be determined by taking into consideration which side the coated surface is to be, outside or inside, the forming condition, the heating condition after forming, or others, but it may preferably be 5 to 100 mg/m² and more preferably 30 to 60 mg/m².

EXAMPLES

Aluminum alloys each having the composition shown in Tables 1 to 3 were melted and casted in a normal manner, and the resultant aluminum alloy ingots were subjected to facing and homogenization heat treatment at a temperature of 550° C. for an hour. The thus treated aluminum alloy ingots were normally subjected to hot rolling, cold rolling, and continuous annealing, and thereafter subjected to another cold rolling at the reduction ratios shown in Tables 1 to 3 to obtain aluminum alloy sample sheets each having a thickness of 0.25 mm, which were then subjected to any one of the surface treatments of (A) to (D) as described below.

(A)
[Etching treatment]
The sample sheets were dipped in sodium hydroxide aqueous solution (50g/l) having a temperature of 60° C. for 15 seconds and washed. Subsequently, they were dipped in sulfuric acid (15 g/l) having a temperature of 15° C. for 15 seconds, and washed and dried.

(B)
[Electrolytic chromic acid treatment]
The sample sheets were electrolyzed in an aqueous solution containing 100 g/l of chromic acid anhydride as a main agent and 5 g/l of sodium fluoride as an aid and having a temperature of 40° C. at a cathode current density of 100 A/d m² so as to form a two-layer film composed of 32 to 41 mg/m² of metal chrome and 12 to 15 mg/m² of chromic hydrateoxide on the sample sheets.

(C)
[Etching plus electrolytic chromic acid treatment]
The sample sheets were dipped in sodium hydroxide aqueous solution (50 g/l) having a temperature of 60° C. for 15 seconds and washed. Subsequently, they were dipped in sulfuric acid (15 g/l) having a temperature of 15° C. for 15 seconds, and washed. Further, they were electrolyzed in an aqueous solution containing 100 g/l of chromic acid anhydride as a main agent and 5 g/l of sodium fluoride as an aid and having a temperature of 40° C. at a cathode current density of 100 A/d m² so as to form a two-layer film composed of 21 to 28 mg/m² of metal chrome and 7 to 11 mg/m² of chromic hydrateoxide on the sample sheets.

(D)
[Phosphoric acid chromating]
An aqueous solution containing 70 g/l of phosphoric acid, 12 g/l of chromic acid anhydride, and 5 g/l of sodium fluoride and having a temperature of 60° C. was sprayed over each sample sheet to form a chromate layer of 13 to 20 mg/m² by the weight of chromium thereon.

Each sample sheet subjected to any of the surface treatments mentioned above was then heated under the conditions shown in Tables 1 to 3 and both surfaces of the sample sheet were laminated with a copolymerization polyester resin film bi-axially oriented consisting of 12 mol % polyethylene isophthalate and 88 mol % polyethylene terephthalate and having a thickness of 20 μm, and immediately quenched in water. After drying, 50 mg/m² of glamour wax having a boiling point of 115° C. was applied to both surfaces of the obtained laminate to prepare a test sample. The test sample was evaluated with regard to strength after bending and bending back operations, formability with the composite forming, pressure resistance, and surface adhesion of the aluminum alloy sheet to the resin coating film after forming. The strength after bending and bending back operations was defined by a mark of ○ standing for good and the other mark of X standing for poor. Namely, when a test sample that underwent bending and bending back operations with the bending radius of 0.5 mm exhibits a tensile strength of 30% or more than 30% relative to the yield strength of the same prior to the bending and bending back operations, it is given the mark of ○ and when another test sample exhibits a tensile strength less than 30% of the yield strength thereof, it is given the mark of X. The evaluation for the pressure resistance of a can was performed as follows: A drawn can of diameter 65 mm was produced from the resin coated aluminum alloy sample sheet by the normal drawing forming, a bottom portion of which was then dome-like formed, and the drawn can was internally pressurized. The evaluation is determined by measuring a pressure which causes the bottom portion to be dented. When the denting pressure is 6.3 kgf/cm$^2$ or more, the mark of ○ (good) is given and when the denting pressure is less than 6.3 kgf/cm$^2$, the mark of X (poor) is given. The evaluation for the composite formability was performed as follows: A drawn can of diameter 100 mm formed with a drawing ratio of 1.6 was formed into a primary redrawn can having a diameter of 75 mm and a wall thickness of 80% of the original wall thickness, which subsequently underwent secondary redrawing, and the thus formed secondary redrawn can was evaluated with regard to its secondary redraw ability. The secondary redrawing was performed with a redrawing ratio of 1.15 and a shoulder radius of 0.4 mm of the redrawing portion of a die, and with a clearance of the ironing portion of the die variably selected. Under such conditions, formability of the redrawn can was evaluated with respect to the die shoulder rounded portion and the ironing portion, respectively, based on whether or not breaking occurred in the can wall during the secondary redrawing operation. When no breaking occurred, the mark of ○ standing for good is given and when breaking occurred, the mark of X standing for poor is given. The evaluation for the adhesion was performed as follows: A drawn can formed through the secondary redrawing under the same conditions as above was evaluated with regard to its inner wall surface based on whether the resin coating was peeled off or not. When the resin coating was not peeled off, the mark of ○ standing for good is given and when the resin coating was peeled off, the mark of X standing for poor is given. The evaluation results are shown in Tables 4 to 6.

POSSIBLE USE IN THE FIELD

The present invention comprises a method of manufacturing a resin-coated aluminum alloy sheet for a drawn and ironed can, which comprises the steps of homogenization heat treating an aluminum alloy ingot containing essentially 0.5 to 2.0 wt % of Mn, 0.2 to 2.0 wt % of Mg, 0.05 to 0.4 wt % of Si and not more than 0.7 wt % of Fe as inevitable impurities, wherein (Si+Fe)≦0.9 wt %, subjecting the resultant product to hot rolling by a normal manner to obtain a hot-rolled aluminum alloy sheet, subsequently subjecting the hot-rolled sheet to continuous annealing or box annealing, cold rolling at a reduction ratio of 60 to 95%, and surface treatment, heating the thus surface treated aluminum alloy sheet at a temperature of 240 to 350° C. within one minute, retaining the aluminum alloy sheet at a temperature of 220 to 300° C. and coating both surfaces of the sheet with a thermoplastic resin, and immediately quenching the resultant product. Further, the present invention is characterized in that the surface treatment applied onto the aluminum alloy sheet is any one of the treatments of (A) etching, (B) electrolytic chromic acid treatment, (C) etching plus electrolytic chromic acid treatment, and (D) phosphoric acid chromating. Thus, the present invention makes it possible to manufacture a resin-coated aluminum alloy sheet for drawn and ironed cans which can be formed into a drawn and ironed can free from its wall breaking and having enough strength as a can, when the can is formed through the composite forming process, the process including a step of bending and bending back operation at a die shoulder rounded portion of a small shoulder radius and a subsequent step of ironing operation, under dry conditions.

TABLE 1

Alloy composition and producing conditions of sample sheets (1)

| Sample No. | Alloy composition (wt %) | | | | | Type of annealing | Cold rolling reduction ratio (%) | Surface Treatment | Heating condition | | Sheet temperature in lamination (° C.) |
| --- | --- | --- | --- | --- | --- | --- | --- | --- | --- | --- | --- |
| | Mn | Mg | Si | Fe | Al | | | | Temp. (° C.) | Time (sec) | |
| 1 | 1.37 | 1.68 | 0.20 | 0.42 | balance | CA | 90 | A | 240 | 15 | 245 |
| 2 | 1.37 | 1.68 | 0.20 | 0.42 | balance | CA | 97 | A | 240 | 15 | 245 |
| 3 | 1.37 | 1.68 | 0.20 | 0.42 | balance | CA | 65 | A | 350 | 50 | 245 |
| 4 | 1.37 | 1.68 | 0.20 | 0.42 | balance | CA | 65 | A | 350 | 75 | 245 |
| 5 | 1.37 | 1.68 | 0.20 | 0.42 | balance | CA | 45 | A | 350 | 50 | 245 |
| 6 | 1.37 | 1.68 | 0.20 | 0.42 | balance | CA | 90 | A | 210 | 50 | 245 |
| 7 | 1.37 | 1.68 | 0.20 | 0.42 | balance | CA | 65 | A | 370 | 10 | 245 |
| 8 | 1.37 | 1.68 | 0.20 | 0.42 | balance | BA | 90 | B | 240 | 15 | 245 |
| 9 | 1.37 | 1.68 | 0.20 | 0.42 | balance | BA | 97 | B | 240 | 15 | 245 |
| 10 | 1.37 | 1.68 | 0.20 | 0.42 | balance | BA | 65 | B | 350 | 50 | 245 |
| 11 | 1.37 | 1.68 | 0.20 | 0.42 | balance | BA | 65 | B | 350 | 70 | 245 |
| 12 | 1.37 | 1.68 | 0.20 | 0.42 | balance | BA | 45 | B | 350 | 50 | 245 |

TABLE 2

Alloy composition and producing conditions of sample sheets (2)

| Sample No. | Alloy composition (wt %) | | | | | Type of annealing | Cold rolling reduction ratio (%) | Surface Treatment | Heating condition | | Sheet temperature in lamination (° C.) |
| --- | --- | --- | --- | --- | --- | --- | --- | --- | --- | --- | --- |
| | Mn | Mg | Si | Fe | Al | | | | Temp. (° C.) | Time (sec) | |
| 13 | 1.37 | 1.68 | 0.20 | 0.42 | balance | BA | 97 | B | 220 | 50 | 245 |
| 14 | 1.37 | 1.68 | 0.20 | 0.42 | balance | BA | 45 | B | 370 | 10 | 245 |

TABLE 2-continued

Alloy composition and producing conditions of sample sheets (2)

| Sample No. | Alloy composition (wt %) | | | | | Type of annealing | Cold rolling reduction ratio (%) | Surface Treatment | Heating condition | | Sheet temperature in lamination (° C.) |
|---|---|---|---|---|---|---|---|---|---|---|---|
| | Mn | Mg | Si | Fe | Al | | | | Temp. (° C.) | Time (sec) | |
| 15 | 0.42 | 1.67 | 0.21 | 0.42 | balance | CA | 70 | C | 300 | 15 | 245 |
| 16 | 0.51 | 1.68 | 0.21 | 0.41 | balance, | CA | 70 | C | 300 | 15 | 245 |
| 17 | 1.98 | 1.66 | 0.22 | 0.44 | balance | CA | 70 | C | 300 | 15 | 245 |
| 18 | 2.11 | 1.69 | 0.18 | 0.40 | balance | CA | 70 | C | 300 | 15 | 245 |
| 19 | 1.40 | 0.09 | 0.24 | 0.39 | balance | CA | 70 | C | 300 | 15 | 245 |
| 20 | 1.38 | 0.23 | 0.17 | 0.32 | balance | CA | 70 | C | 300 | 15 | 245 |
| 21 | 1.39 | 1.92 | 0.20 | 0.40 | balance | CA | 70 | C | 300 | 15 | 245 |
| 22 | 1.37 | 2.13 | 0.22 | 0.39 | balance | CA | 70 | C | 300 | 15 | 245 |
| 23 | 1.41 | 1.69 | 0.04 | 0.41 | balance | CA | 70 | D | 300 | 15 | 245 |
| 24 | 1.39 | 1.70 | 0.14 | 0.40 | balance | CA | 70 | D | 300 | 15 | 245 |

TABLE 3

Alloy composition and producing conditions of sample sheets (3)

| Sample No. | Alloy composition (wt %) | | | | | Type of annealing | Cold rolling reduction ratio (%) | Surface Treatment | Heating condition | | Sheet temperature in lamination (° C.) |
|---|---|---|---|---|---|---|---|---|---|---|---|
| | Mn | Mg | Si | Fe | Al | | | | Temp. (° C.) | Time (sec) | |
| 25 | 1.41 | 1.69 | 0.38 | 0.42 | balance | CA | 70 | D | 300 | 15 | 245 |
| 26 | 1.40 | 1.70 | 0.49 | 0.39 | balance | CA | 70 | D | 300 | 15 | 245 |
| 27 | 1.38 | 1.65 | 0.11 | 0.68 | balance | CA | 70 | D | 300 | 15 | 245 |
| 28 | 1.38 | 1.65 | 0.19 | 0.84 | balance | CA | 70 | D | 300 | 15 | 245 |
| 29 | 1.37 | 1.68 | 0.20 | 0.42 | balance | CA | 70 | D | 300 | 15 | 210 |
| 30 | 1.37 | 1.68 | 0.20 | 0.42 | balance | CA | 70 | D | 300 | 15 | 220 |
| 31 | 1.37 | 1.68 | 0.20 | 0.42 | balance | CA | 70 | D | 300 | 15 | 300 |
| 32 | 1.37 | 1.68 | 0.20 | 0.42 | balance | CA | 70 | D | 300 | 15 | 315 |

TABLE 4

Evaluation results of properties of sample sheets(1)

| Sample No. | Strength after bending & bending back | Composite formability | Pressure resistance | Adhesion | Division |
|---|---|---|---|---|---|
| 1 | ○ | ○ | ○ | ○ | Example |
| 2 | X | X | — | — | Comparative |
| 3 | ○ | ○ | ○ | ○ | Example |
| 4 | ○ | ○ | X | ○ | Comparative |
| 5 | ○ | ○ | X | ○ | Comparative |
| 6 | X | X | — | — | Comparative |
| 7 | ○ | ○ | X | ○ | Comparative |
| 8 | ○ | ○ | ○ | ○ | Example |
| 9 | X | X | — | — | Comparative |
| 10 | ○ | ○ | ○ | ○ | Example |
| 11 | ○ | ○ | X | ○ | Comparative |
| 12 | ○ | ○ | X | ○ | Comparative |

(Remarks)-:Not evaluated

TABLE 5

Evaluation results of properties of sample sheets(2)

| Sample No. | Strength after bending & bending back | Composite formability | Pressure resistance | Adhesion | Division |
|---|---|---|---|---|---|
| 13 | X | X | — | — | Comparative |
| 14 | ○ | ○ | X | ○ | Comparative |
| 15 | ○ | ○ | X | ○ | Comparative |
| 16 | ○ | ○ | ○ | ○ | Example |
| 17 | ○ | ○ | ○ | ○ | Example |
| 18 | X | X | — | — | Comparative |
| 19 | ○ | ○ | X | ○ | Comparative |
| 20 | ○ | ○ | ○ | ○ | Example |
| 21 | ○ | ○ | ○ | ○ | Example |
| 22 | X | X | — | — | Comparative |
| 23 | ○ | ○ | X | ○ | Comparative |
| 24 | ○ | ○ | ○ | ○ | Example |

(Remarks)-:Not evaluated

TABLE 6

Evaluation results of properties of sample sheets(3)

| Sample No. | Strength after bending & bending back | Composite formability | Pressure resistance | Adhesion | Division |
|---|---|---|---|---|---|
| 25 | ○ | ○ | ○ | ○ | Example |
| 26 | X | X | — | — | Comparative |
| 27 | ○ | ○ | ○ | ○ | Example |
| 28 | X | X | — | — | Comparative |
| 29 | ○ | ○ | ○ | X | Comparative |
| 30 | ○ | ○ | ○ | ○ | Example |
| 31 | ○ | ○ | ○ | ○ | Example |
| 32 | — | — | — | — | Comparative |

(Remarks)-:Not evaluated

What is claimed is:

1. A method of manufacturing a resin-coated aluminum alloy sheet for a drawn and ironed can, comprising homogenization heat treating an aluminum alloy ingot consisting essentially of 0.5 to 2.0 wt % of Mn, 0.2 to 2.0 wt % of Mg, 0.05 to 0.4 wt % of Si and not more than 0.7 wt % of Fe wherein (Si+Fe)>0.9 wt %, and balance Al, subjecting the heat-treated aluminum alloy ingot to hot rolling to obtain a hot-rolled aluminum alloy sheet, subsequently subjecting the hot-rolled sheet to continuous annealing, cold rolling at a reduction ratio of 60 to 95%, and a surface treatment, heating the thus surface treated aluminum alloy sheet at a temperature of 240 to 350° C. for not more than one minute to recover formability, retaining the temperature of the aluminum alloy sheet at 220 to 300° C., coating both surfaces of the sheet with thermoplastic resin, and immediately quenching the thermoplastic coated aluminum alloy sheet.

2. A method for manufacturing a resin-coated aluminum alloy sheet for a drawn and ironed can, comprising homogenization heat treating an aluminum alloy ingot consisting essentially of 0.5 to 2.0 wt % of Mn, 0.2 to 2.0 wt % of Mg, 0.05 to 0.4 wt % of Si and not more than 0.7 wt % of Fe, wherein (Si+Fe)≦0.9 wt %, and balance Al, subjecting the heat-treated aluminum alloy ingot to hot rolling to obtain a hot-rolled aluminum alloy sheet, subsequently subjecting the hot-rolled sheet to box annealing, cold rolling at a reduction ratio of 60 to 95%, and a surface treatment, heating the thus surface treated aluminum alloy sheet at a temperature of 240 to 350° C. for not more than one minute to recover formability, retaining the temperature of the aluminum alloy sheet at 220 to 300° C., coating both surfaces of the sheet with a thermoplastic resin, and immediately quenching the thermoplastic coated aluminum alloy sheet.

3. A method of manufacturing a resin-coated aluminum alloy sheet for a drawn and ironed can as claimed in claim 1, characterized in that the thermoplastic resin coated onto the aluminum alloy sheet is a thermoplastic polyester resin.

4. A method of manufacturing a resin-coated aluminum alloy sheet for a drawn and ironed can as claimed in claim 1, characterized in that the surface treatment applied onto the aluminum alloy sheet is etching and/or electrolytic chromic acid treatment.

5. A method of manufacturing a resin-coated aluminum alloy sheet for a drawn and ironed can as claimed in claim 1, characterized in that the surface treatment applied onto the aluminum alloy sheet is phosphoric acid chromating.

6. A method of manufacturing a resin-coated aluminum alloy sheet for a drawn and ironed can as claimed in claim 2, characterized in that the thermoplastic resin coated onto the aluminum alloy sheet is a thermoplastic polyester resin.

7. A method of manufacturing a resin-coated aluminum alloy sheet for a drawn and ironed can as claimed in claim 2, characterized in that the surface treatment applied onto the aluminum alloy sheet is etching and/or electrolytic chromic acid treatment.

8. A method of manufacturing a resin-coated alumizum alloy sheet for a drawn and ironed can as claimed in claim 2, characterized in that the surface treatment applied onto the aluminum alloy sheet is phosphoric acid chromating.

* * * * *